United States Patent Office 2,773,758
Patented Dec. 11, 1956

2,773,758

HERBICIDAL COMPOSITIONS

Arthur H. Schlesinger, Dayton, Ohio, assignor to Monsanto Chemical Company, St. Louis, Mo., a corporation of Delaware No Drawing. Application April 3, 1953,
Serial No. 346,781

8 Claims. (Cl. 71—2.3)

The present invention provides new and valuable compositions possessing selective herbicidal efficacy and methods of destroying or preventing plant growth in which such compositions are used.

I have found that improved, very efficient, selective herbicidal compositions are obtained when there are prepared oil-in-water emulsions of chlorine-substituted 3-acetylbiphenyl. As examples of compounds useful for the present purpose may be mentioned the chain-substituted compounds, e. g., 3-mono-, di- or trichloroacetylbiphenyl; the nuclearly-substituted compounds such as 4-chloro-3-acetylbiphenyl, 4,4'-dichloro-3-acetylbiphenyl and the ar-tri-, tetra-, or octa-chloro-3-acetylbiphenyls and compounds containing both aliphatic and aromatic chlorine substitutions such as 5-chloro-3-chloroacetylbiphenyl, ar-dichloro-3-dichloroacetylbiphenyl, etc.

The presently useful chlorine-substituted 3-acetylbiphenyls may be readily prepared by contacting 3-acetylbiphenyl with chlorine in the presence or absence of a catalyst and in the presence or absence of light. Chlorination of the 3-acetylbiphenyl with substitution in the aliphatic portion of the molecule takes place readily by simply passing elemental chlorine into a solution of the 3-acetylbiphenyl in the absence of a catalyst but in the presence of sunlight or other source of radiant energy. Chlorination of the 3-acetylbiphenyl with substitution in the aromatic nucleus of the molecule is effected by conducting the reaction in the dark and in the presence of a catalyst known to favor aromatic substitution, e. g., a heavy metal such as iron, manganese or lead, or a halide thereof such as ferric chloride, zinc bromide, aluminum chloride, etc. Depending upon the nature of the catalyst and the quantity of chlorine used, the catalytic chlorination of 3-acetylbiphenyl may result not only in nuclear substitution, but also in some aliphatic substitution. This is particularly true in the preparation of the polychloro-substituted m-acetylbiphenyls.

The chlorination reaction, whether effected in the light or in the dark and either in the presence or absence of catalysts is somewhat exothermic. However, no cooling precautions need be employed in the process; and particularly when the polychloro-substituted m-acetylbiphenyls are the desired products, it may even be advantageous to employ moderate external heating. As may be apparent to those skilled in the art, the size of the reactor and reactant quantities may also determine the extent of heating or cooling.

The selective herbicidal efficiency of the present compounds appears to be directly related to the chlorine content thereof as well as to the presence of the acetyl radical in the meta-position. Thus, the unchlorinated 2-acetylbiphenyl has no injurious effect on plants when 1.0 percent oil-in-water emulsions of the same are applied to the plants, whereas the same quantity of 3-acetylbiphenyl applied to plants in the same manner kills both broad-leafed and narrow-leafed plants and dries the leaves thereof. Introduction of chlorine into the 3-acetylbiphenyl, either into the aliphatic and/or aromatic portion of the molecule, lessens toxicity towards broad-leafed plants without a like decrease in toxicity towards narrow-leafed plants. Hence the present chlorine-substituted m-acetylbiphenyls may be employed very advantageously for ridding truck crop fields, e. g., beans, strawberries, etc. of invading grasses.

As may be apparent to those skilled in the art, the product obtained by passing chlorine into m-acetylbiphenyl may contain some of the unchlorinated ketone depending upon the quantity of halogen used, the reaction conditions employed, and the isolating methods used. The presence of a small quantity of m-acetylbiphenyl in the present herbicidal compositions has no adverse effect on the efficiency thereof provided that the chlorine-content of the chlorinated 3-acetylbiphenyl is at least 10 percent by weight of the active ingredient. A monochloro-substituted m-acetylbiphenyl has a calculated chlorine content of 15.4 percent.

Herbicidal compositions containing the present chloro-substituted m-acetylbiphenyls are readily obtained by first preparing a solution thereof in an organic solvent and then adding the resulting solution to water containing an emulsifying agent to form an emulsion. Because of the high herbicidal efficiency of the present compounds, they are present in the herbicidal composition in only very small concentrations, for example in concentrations of from 0.3 percent to 2 percent by weight of the total weight of the emulsion. Emulsifying agents which may be employed are those customarily used in the art for the preparation of oil-in-water emulsions. Examples of emulsifying agents which may be used include alkylbenzenesulfonates, long chained polyalkyleneglycols, long chained succinates, etc. The emulsions may be used to destroy already existing plant growth by direct application to the undesirable plants, e. g., by spraying, or the emulsions may be employed to prevent plant growth by application to media which normally support plant growth.

The present invention is further illustrated, but not limited, by the following examples:

*Example 1*

Chlorine was introduced for 40 minutes in the light and in the absence of a catalyst into a solution of 40 g. of 3-acetylbiphenyl. During this period the reaction mixture rose from 23° C. to 52° C. and then fell to 38° C. The reaction mixture was then divided into halves in order to gauge the progress of the reaction. One half was diluted with 75 ml. of carbon tetrachloride and chlorine was passed into the diluted material for 20 minutes. During this time the temperature rose from 28° C. to 32° C. within the first 10 minutes, and then returned to 28° C. The solvent was then stripped off by heating the reaction mixture under partial pressure. The residue was a thick, syrupy material analyzing 14.42 percent chlorine (calculated for a mono-chloro-substituted acetylbiphenyl, $C_{14}H_{11}OCl$, 15.5 percent). Because the chlorination was executed under conditions conducive to chain-chlorination, the product is probably 3-chloroacetylbiphenyl. In the evaluation data of Example 3, it is so designated.

*Example 2*

This example describes catalytic chlorination of m-acetylbiphenyl in the dark.

A black flask was charged with 65 g. of 3-acetylbiphenyl, 300 g. of sym.-tetrachloroethane, and 5 g. of ferric chloride. Chlorine was passed into this charge, with stirring, for a total of about 5 hours. The temperature rose from 25° C. to a high of 42° C. during the reaction. At the end of the chlorination period it had decreased to 25° C. The solvent was then removed from the reaction mixture by distilling in a column under partial vacuum. The residue was allowed to dry overnight in a vacuum oven with an air stream at 25° C. The dried, black oily product (85 g.) thus obtained analyzed 44.94 percent Cl (calcd. Cl for $C_{14}M_8OCl_4$, 42.5 percent). It was thus either a substantially tetra-chloro-substituted m-acetylbiphenyl, or a mixture of chlorine-substituted m-acetylbiphenyls having an average of four chlorine substituents. Probably only nuclear substitution is present. This product is designated as tetrachloro-substituted 3-acetylbiphenyl in Example 3.

*Example 3*

Spray testing of the chloro-substituted 3-acetylbiphenyls of Examples 1 and 2 as well as of some related compounds was conducted as follows:

Respective cyclohexanone solutions of the test compounds shown below were added to water, the quantity of solution employed being calculated to give emulsions containing 1.0 percent and 0.3 percent, respectively, of the compound to be tested, based on the weight of the total emulsion. The quantity of emulsifying agent used was 0.2 percent by weight, based on the weight of the total emulsion. Said emulsifying agent comprised a mixture of a polyalkyleneglycol derivative and an alkylbenzenesulfonate.

Three week old corn and bean plants were sprayed with the respective emulsions, two plants of each variety being employed. The spraying was continued until droplets formed on and/or fell from the foliage and stems of the sprayed plants, up to 15 ml. of the emulsion being applied to each plant. The sprayed plants as well as two untreated "blank" specimens of each plant were then allowed to remain under standard conditions of sunlight and watering for a period of 1 week. At the end of that time the sprayed plants were compared with the untreated plants in order to determine the extent of injury, if any. The following observations were made:

| Product Tested, at Percent Concentration | Extent [1] of Injury on— | |
|---|---|---|
| | Bean | Corn |
| 3-Chloroacetylbiphenyl (Ex. 1): | | |
| 1.0% | 2 | 4, 4a |
| 0.3% | 1 | 2 |
| Tetra-chloro-substituted acetylbiphenyl (Ex. 2): | | |
| 1.0% | 1 | 4, 4a |
| 0.3% | 0 | 3, 4a |
| 4-Chloroacetylbiphenyl [2]: | | |
| 1.0% | 1 | 2 |
| 0.3% | 0 | 1 |
| 2-Acetylbiphenyl: | | |
| 1.0% | 0 | 0 |
| 0.3% | 0 | 0 |
| 3-Acetylbiphenyl: | | |
| 1.0% | 4, 4a | 4, 4a |
| 0.3% | 2 | 2 |

[1] 0=no injury; 1=slight injury; 2=moderate injury; 3=serious injury; 4=plant dead; 4a=leaves dried.
[2] Prepared by Friedel-Crafts reaction from biphenyl and chloroacetyl chloride.

While the present chlorine-substituted m-acetylbiphenyls are most advantageously employed as herbicides by incorporating them into an aqueous emulsion as herein described, they may also be employed in other plant-destroying methods. Thus, they may be incorporated into solid carriers such as clay, talc, pumice and bentonite to give herbicidal compositions which may be applied to living plants or to surfaces which are to be freed from plant growth. The present chloro-substituted ketones may also be mixed with liquid or solid agricultural pesticides, e. g., insecticides and fungicides. While solutions of the present chloro-substituted m-acetylbiphenyls in organic solvents may be employed for preventing and destroying plant growth, I have found that the emulsions possess an improved tendency to adhere to the treated surfaces and that less of the active ingredient is required to give comparable herbicidal efficiency.

What I claim is:

1. A herbicidal composition comprising an oil-in-water emulsion of a phytotoxic quantity of a chloro-substituted 3-acetylbiphenyl.

2. A herbicidal composition comprising an oil-in-water emulsion of a phytotoxic quantity of 3-chloroacetylbiphenyl.

3. A herbicidal composition comprising an oil-in-water emulsion of a phytotoxic quantity of a chlorination product prepared by passing chlorine into 3-acetylbiphenyl in the dark and in the presence of a metal halide catalyst until approximately 4 moles of chlorine per mole of the 3-acetylbiphenyl have reacted with said acetylbiphenyl.

4. The method of destroying undesired plants which comprises applying to said plants a toxic quantity of a herbicidal composition containing as the essential active ingredient a chloro-substituted 3-acetylbiphenyl.

5. The method of destroying undesired plants which comprises applying to said plants a toxic quantity of a herbicidal composition containing 3-chloroacetylbiphenyl as the essential active ingredient.

6. The method of destroying undesired plants which comprises applying to said plants a toxic quantity of a herbicidal composition containing as the essential active ingredient a chlorination product prepared by passing chlorine into 3-acetylbiphenyl in the dark and in the presence of a metal halide catalyst until approximately 4 moles of chlorine per mole of the 3-acetylbiphenyl have reacted with said acetylbiphenyl.

7. The method of destroying undesired plants which comprises applying to said plants a toxic quantity of an oil-in-water emulsion of a chloro-substituted 3-acetylbiphenyl.

8. A chlorination product prepared by passing chlorine into 3-acetylbiphenyl in the dark and in the presence of a metal halide catalyst until approximately 4 moles of chlorine per mole of the 3-acetylbiphenyl have reacted with said acetylbiphenyl.

References Cited in the file of this patent

UNITED STATES PATENTS

| 2,496,067 | Rosenthal | Jan. 31, 1950 |
| 2,516,098 | Bambas | July 25, 1950 |